(12) United States Patent  
Tardy et al.

(10) Patent No.: US 8,500,437 B2  
(45) Date of Patent: Aug. 6, 2013

(54) PROCESS FOR MANUFACTURING A PLASTIC HOLLOW BODY, DEVICE AND EQUIPMENT FOR THE IMPLEMENTATION THEREOF

(75) Inventors: Pierre-Francois Tardy, Brussels (BE); Bjorn Criel, Sint-Martens-Lennik (BE); Philippe Bournonville, Floriffoux (BE)

(73) Assignee: Inergy Automotive Systems Research (S.A.), Brussels (BE)

( * ) Notice: Subject to any disclaimer, the term of this patent is extended or adjusted under 35 U.S.C. 154(b) by 0 days.

(21) Appl. No.: 13/153,097

(22) Filed: Jun. 3, 2011

(65) Prior Publication Data

US 2011/0233817 A1 Sep. 29, 2011

Related U.S. Application Data

(62) Division of application No. 12/196,530, filed on Aug. 22, 2008, now Pat. No. 7,976,754.

(30) Foreign Application Priority Data

Aug. 29, 2007 (FR) ..................................... 07 57244  
Sep. 24, 2007 (FR) ..................................... 07 57790

(51) Int. Cl.  
*B29C 49/00* (2006.01)

(52) U.S. Cl.  
USPC ........... 425/528; 425/112; 425/113; 425/529; 425/530; 425/531; 425/532

(58) Field of Classification Search  
USPC ................. 425/112–113, 528–532  
See application file for complete search history.

(56) References Cited

U.S. PATENT DOCUMENTS

| | | | |
|---|---|---|---|
| 3,891,733 A | 6/1975 | Maroschak | |
| 5,057,267 A | 10/1991 | Seizert et al. | |
| 6,866,812 B2 * | 3/2005 | Van Schaftingen et al. | .. 264/515 |
| 6,893,603 B2 | 5/2005 | Rohde et al. | |
| 2003/0075838 A1 * | 4/2003 | Vardin et al. | .................. 264/532 |
| 2006/0001197 A1 * | 1/2006 | Kummer | ....................... 264/540 |
| 2006/0141184 A1 * | 6/2006 | Rohde et al. | ................. 428/35.7 |

FOREIGN PATENT DOCUMENTS

| | | |
|---|---|---|
| EP | 0653286 A2 | 5/1995 |
| EP | 653286 A2 * | 5/1995 |
| EP | 1110697 | 6/2001 |
| GB | 1410215 | 10/1975 |
| WO | WO2007000454 | 1/2007 |

\* cited by examiner

*Primary Examiner* — Amjad Abraham  
(74) *Attorney, Agent, or Firm* — Oblon, Spivak, McClelland, Maier & Neustadt, L.L.P.

(57) ABSTRACT

Process for manufacturing a plastic hollow body, the process comprising the following steps:
- a) a tubular stream of molten plastic is extruded;
- b) this stream is taken up by means of a tensioning device;
- c) a transverse cut is made in this stream so as to create a parison having one free edge that is not taken up by the tensioning device;
- d) the parison is moved relative to the tensioning device so that the free edge of the parison is also taken up by the tensioning device; and
- e) at least one longitudinal cut is made in the parison over its entire length.

Equipment suitable for implementing this process.

10 Claims, 3 Drawing Sheets

PROCESS FOR MANUFACTURING A PLASTIC HOLLOW BODY, DEVICE AND EQUIPMENT FOR THE IMPLEMENTATION THEREOF

CROSS-REFERENCE TO RELATED APPLICATIONS

This application is a Divisional Application of U.S. Ser. No. 12/196,530, filed Aug. 22, 2008, which claims the benefit of priority under 35 U.S.C. §119 (a) and (b) to pending French Application No. 0757244, filed Aug. 29, 2007 and pending French Application No. 0757790, filed Sep. 24, 2007, each of which is incorporated herein by reference in its entirety.

FIELD OF THE INVENTION

The present invention relates to a process for manufacturing a plastic hollow body (in particular a fuel tank), to a device and equipment for the implementation thereof.

BACKGROUND OF THE INVENTION

Fuel systems on board vehicles of various types generally comprise devices for the ventilation of hydrocarbons contained in the tank. They may also include devices for supplying the engine with fuel. Such devices form the link between elements contained in the tank (valves, fuel pump, etc.) and elements positioned outside the tank (canister, fill pipe, etc.). Penetration through the wall of the tank must take into account the low permeability requirements laid down by current environmental standards (LEV II and PZEV for example). For this purpose, the reduction in the number and size of the openings in the wall of the tank constitutes a favourable factor in reducing evaporative losses. However, this makes it more difficult to insert components into the tank and position them therein.

Application EP 1110697 in the name of the Applicant discloses a process for moulding a fuel tank using a parison in several sections so as to be able to insert accessories into the tank at the same time as it is moulded. For this purpose, a tubular parison is extruded, then, on exiting the die, two longitudinal cuts are made in it, along two opposing generatrices, before being converted into two separate sheets by transverse cutting of the split parison. Application EP '697 does not describe how the sheets are held after the cuts have been made or how the longitudinal cuts are made over the entire length of the parison.

One process for manufacturing a hollow body by moulding, starting from an extruded parison, is also described in Application US 2006/0001197. During this process a tubular stream of molten plastic is extruded and positioned between the parts of a mould that define a mould cavity for the stream of material, then it is taken up by a tensioning device so that the stream of material is extended transversely with respect to the extrusion direction and beyond the lateral edges the mould cavity. The mould is then closed and a hollow body is moulded. When the mould is closed, excrescences are created in the stream of material and outside the lateral edges of the mould cavity. These are then cut longitudinally on each side of the mould along edges that extend in the extrusion direction so as to be able to release the tensioning device. The longitudinal cuts are not made over the entire length of the excrescences so that the moulded hollow body has a free uncut edge. The device and process described in Application US '197 are therefore not suitable for cutting a parison so as to form two separate sheets as in Application EP '697.

SUMMARY OF THE INVENTION

The objective of the invention is therefore to adapt the device and process from Application US '197 to the manufacture of a hollow body as described in Application EP '697 by providing a simple and effective solution to the problem of cutting the parison along its entire length.

For this purpose, the invention relates to a process for manufacturing a plastic hollow body, said process comprising the following steps:

a) a tubular stream of molten plastic is extruded;
b) the stream is taken up by means of a tensioning device;
c) a transverse cut is made in this stream so as to create a parison having one free edge that is not taken up by the tensioning device;
d) the parison is moved relative to the tensioning device so that the free edge of the parison is also taken up by the tensioning device; and
e) at least one longitudinal cut is made in the parison over its entire length.

The process according to the invention is suitable for any hollow body and, in particular, for any hollow body to the inside of which it is desired to introduce at least one accessory. It advantageously applies to the manufacture of fuel tanks. The expression "fuel tank" is understood to mean a leakproof tank, able to store fuel under diverse and varied usage and environmental conditions. An example of this tank is that with which motor vehicles are fitted.

The hollow body obtained by the process according to the invention is made with a plastic wall, generally comprising an internal face on its concave portion and an external face on its convex portion.

The term "plastic" is understood to mean any material comprising at least one synthetic resin polymer.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, in a non-limiting way: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used; similarly it is also possible to use a blend of polymeric materials with inorganic, organic and/or natural filters such as, for example but in anon-limiting manner: carbon, salts and other inorganic derivatives, natural or polymeric fibers. It is also possible to use multilayer structures composed of stacked and joined layers comprising at least one of the polymers or copolymers described above.

One polymer often used for fuel tanks is polyethylene. Excellent results have been obtained with high-density polyethylene (HDPE).

Preferably, the hollow body for which the process according to the invention is intended has a multilayer structure comprising at least one layer of thermoplastic and at least one additional layer which, advantageously, may consist of a material that is a barrier to liquids and/or gases.

Preferably, the nature and the thickness of the barrier layer are chosen so as to minimize the permeability of the liquids and gases in contact with the wall of the hollow body. Preferably, in the case of a fuel tank, this layer is based on a barrier material, i.e. on a fuel-impermeable resin such as, for example, EVOH (a partially hydrolyzed ethylene/vinyl acetate copolymer). Alternatively, the tank may be subjected to a surface treatment (fluorination or sulphonation) for the purpose of making it impermeable to the fuel.

According to the invention, a stream of plastic is extruded, i.e. results from the melting and/or plasticization of the plastic in an extruder, then from its expulsion of this plastic through an extrusion head, which generally gives it a cylindrical shape. This cylindrical stream of material finally passes through a shaping die which also has a circular flow area.

Preferably, the tubular stream has an adjustable thickness (i.e. one that can be varied, in a controlled manner, longitudinally (along a generatrix) and/or transversely (over the same section)) and this using at least one known device such as WDS (vertically displaceable core), PWDS (deformable ring), SFDR (machined core of variable profile or pin of variable shape) or "die slide" (part inserted locally into the die: see U.S. Pat. No. 5,057,267 in the name of the Applicant), integrated into the die. With respect to moulding a tubular stream whose thickness is constant, this way of proceeding makes it possible to take into account the reduction in thickness which occurs during moulding (and in particular, blow moulding) at certain places in the tubular stream, as a result of the non-constant deformation rates of the material in the mould.

One important aspect of the present invention lies in the tensioning of the tubular stream before it is cut longitudinally. The tensioning generally takes place by flattening the tubular stream. This is understood to mean that the tubular stream is subjected to a radial tension (according to a force excited from the inside towards the outside in a substantially radial direction) and this preferably being at 2 diametrically opposed points. It results in a tensioning and a flattening (like when an elastic band is stretched between 2 fingers). It should be noted that the term "flattening" is in fact understood to mean a modification of the cross section of the tubular stream such that its aspect ratio (defined as the ratio of its largest diameter to its smallest diameter) deviates from unity.

Transverse cutting of the tubular stream is carried out (after extrusion of an adequate length) in order to obtain a parison that will be moulded. In the context of the invention, the cut is made by obstructing the flow area in the shaping die. As explained above, the thickness of the tubular stream may be adjusted by means of a device such as a WDS, PWDS, SFDR, or "die slide" device. Obstruction of the flow area is thus obtained when the thickness of the tubular stream is reduced to zero by displacement of a moving part in the die (cf. WDS, PWDS or "die slide" devices) or deformation of a ring (cf. PWDS device) so as to obstruct the flow area.

The term "parison" is understood to mean an extruded preform of any substantially cylindrical or tubular shape, which is intended to form the wall of the hollow body after moulding, i.e. after an operation that consists in forming the parison, which is in the melt state, into the required shapes and dimensions using a mould in order to obtain a one-piece tank.

Preferably, the moulding of the parison comprises a step of integrating component(s) which preferably uses a core. This is understood to mean a part of appropriate size and shape for being able to be inserted between the mould cavities. A part such as this is, for example, described in Patent GB 1 410 215, the content of which is for this purpose incorporated by reference into the present application.

In the process according to this variant of the invention, the internal accessories are preferably fastened to the parison with the aid of the core according to an ideal lay-out. This variant is also the subject of a patent application in the name of the Applicant (PCT/EP2006/063590).

In the process according to the invention, the tank is preferably moulded as a single part (in a single step, after which a one-piece tank is obtained, without recourse to an additional step of assembling separate shells) from the split parison or the parison which is in at least two parts, and this generally being done by welding the split or the two parts of the parison when the mould is closed. In particular, the tank is advantageously moulded by:

blow-moulding, i.e. by expanding the cut parison and pressing it against the mould cavities using a pressurized fluid (as described in Application EP 1110697, the content of which is, for this purpose, incorporated by reference in the present application);

thermoforming the parison, i.e. by pressing the latter against the mould cavities, for example by providing suction (creating a vacuum) behind said cavities.

Preferably, the tank is moulded by blow-moulding. This is because thermoforming generally involves heating the mould at a temperature close to the processing temperature in order to be able to achieve deep deformations (corners of the tank for example, where the parison is highly stretched). This results in cycle times that are longer than with blow-moulding, in which this constraint does not exist.

The present invention also relates to a device for tensioning and flattening an extruded tubular stream of molten plastic that is capable of being inserted inside the latter in order to apply a force to it in a substantially radial direction, characterized in that it comprises at least one longitudinal-cutting device capable of splitting a parison which is attached to it and a device for gripping the parison obtained by transversely cutting the tubular stream, the gripping device being capable of being inserted inside the parison and enabling the latter to move relative to the tensioning device. Specifically, after transversely cutting the stream of extruded material, one part of the parison cannot be taken up by the tensioning device in such a way as to constitute a free edge for the parison. Owing to the device according to the invention, the parison can be moved relative to the tensioning device so that the parison no longer has a free edge. Within the context of the invention, the parison is moved relative to the tensioning device, in general along a substantially vertical direction, so that the parison can be split over its entire length.

The present invention also relates to equipment for implementing the process as described previously. It more particularly relates to equipment including, from upstream to downstream:

an extrusion head that makes it possible to obtain a tubular stream of plastic;

at least one transverse-cutting device that makes it possible to obtain a parison;

a tensioning device as described above; and a mould comprising two cavities that is suitable for moulding the parison.

The movable device that makes it possible to put the extruded tubular stream under tension may be any device. However, in order to follow the movement of the tubular stream without damaging it, this device preferably comprises at least one stretching pin at the place where the force is applied. Particularly preferably, the device comprises two stretching pins that can move relative to one another and that are capable of applying a radial force to the inner wall of the tubular stream at two diametrically opposed points of the latter, and this being achieved by moving them away from one another. According to an advantageous variant these stretching pins are borne by a mobile platform or table, which may be inserted underneath the extrusion head. And according to one particularly advantageous variant, the stretching pins can be moved vertically with respect to this platform due to a movable framework that supports them.

A system of jack(s) advantageously makes it possible to control the radial force of the stretching pins on the tubular stream and, by doing so, to control the tensioning of the tubular stream.

Preferably, the stretching pins are equipped with thermal insulation over at least one part of their length so that the parison which is taken up by the rollers does not undergo thermal cooling when being handled, in particular in the zone that is in contact with the stretching pins. It has been observed that thermal insulation over the stretching pins makes it possible to avoid a local temperature reduction of the parison which may reach around 30 to 40 degrees Celsius.

The equipment according to the invention comprises a longitudinal-cutting device. The longitudinal-cutting device comprises at least one blunt part or blade capable of splitting the parison. Most particularly preferably, it comprises two blades positioned in a diametrically opposed manner so as to separate the parison into two parts or "sheets" along two opposing generatrices. These blades may have any shape. Generally, they have a sharp edge pointing towards the extrusion head. Each blade is preferably moved inside a groove made along one generatrix of a stretching pin.

Moreover, it is in all likelihood the state of tension described above that makes it possible to prevent the sheets from curving, contracting and creasing under the effect of the transverse cutting, which takes place downstream.

The equipment according to the invention comprises a gripping device. The expression "gripping device" is understood to mean any device capable of gripping the parison.

Preferably, the gripping device consists of movable teeth that are generally positioned on the parison tensioning device and that are capable of being moved along the extrusion direction. At the outlet of the extrusion head, the temperature of the parison is sufficient so that it is not completely in a plasticization state and so that the movable teeth can get a grip on the parison. Within the context of the invention, the teeth are moved in an extrusion direction of the parison, which has the effect of moving the parison relative to the tensioning device so that the free edge of the parison is also taken up by the tensioning device.

In general, the profile of the teeth is determined so that the parison can be separated from the gripping device without any contact remaining (for example, in the form of a strand of molten plastic) between the teeth and the parison. This may be, for example, a saw-tooth profile. In the particular case where the tensioning device comprises stretching pins, the teeth are positioned longitudinally over the stretching pins, in general over a moving part that is actuated by a hydraulic jack. In one preferred variant, said part comprises slots positioned longitudinally that cooperate with screws fixed to the stretching pins in such a way that the part can be moved over a path of travel that is substantially equivalent to the longitudinal dimension of the slots. The travel of the part is generally less than 100 mm and preferably between 50 and 100 mm.

In general, the teeth are positioned at a distance of a few mm relative to the groove in which the blade is moved.

In one preferred variant, this device is placed on a platform, also known as a "table", that also bears the device for tensioning and flattening the parison.

In order to keep the parison pieces separated, taut and crease-free, the equipment comprises a device for handling the parison that is capable of holding the sheets after the longitudinal cutting of the parison.

According to one particular variant, the handling device comprises at least two frames, each of which has at least one horizontal arm capable of holding the end of the parison located on the extruder side.

Preferably, each horizontal arm may be integrated into a purge clamp so as to simplify the equipment according to the invention. The purge clamp generally consists of a movable device capable of being moved underneath the extrusion head when a tubular stream is extruded outside of production runs. During these runs, a tubular stream is extruded over a short length (around a few cm) and is then cut transversely. The purge clamp makes it possible to take the cut tubular stream and deposit it on a purge belt placed, in general, underneath the extrusion head. The purge belt is then moved away from the equipment to dispose of the cut tubular stream. After disposal of the cut tubular stream, the belt is again repositioned under the extrusion head to continue to dispose of the tubular stream extruded outside of production runs.

Preferably, the frames are C-shaped and have two horizontal arms separated by means of a vertical arm by a distance that is approximately equivalent to the length of the parison and that are capable of holding the respective ends of the sheets.

The C-shaped frames are generally borne by a stand fixed to the ground and are capable of being moved along a horizontal axis and/or a vertical axis.

The movements of one frame are generally independent of the movements of another frame.

According to this variant also, the horizontal arms are preferably composed of several independent blocks positioned next to one another. The blocks are made from a material that makes it possible to prevent adhesion of the ends of the parison under the effect of the temperature during extrusion and that also makes it possible to prevent cooling of the ends of the parison. This is preferably PTFE.

As indicated above, the device for handling the parison is capable of holding the sheets after the longitudinal cutting of the parison. This device is moved in the same way as the parison when the latter is moved relative to the tensioning device, without the parison being torn.

In the particular case where the handling device comprises at least two frames, the blocks located at the ends of one arm can be moved along an axis at right angles to the arm, by means of a jack. Specifically, when the parison is held by the arms of the frames, the part of the parison which is taken up by the tensioning device cannot also be held by the arms otherwise this part could be subjected to tensile stresses due to the parison rubbing against the tensioning device and would not be free to be moved relative to the tensioning device. This is why the blocks located at the ends of one arm can only be moved against the molten material in order to also hold the parison at the ends of the arms and only after the parison has been moved relative to the tensioning device.

Also preferably, the arms can be moved relative to one another. During the extrusion of a stream of molten plastic, this stream may exhibit, under the effect of its own weight, a stretching phenomenon generally known under the name of "sagging", so that the sheets obtained after cutting the parison exhibit an excrescence at their end furthest away from the extrusion head, and also uneven creases. In this case it is possible to provide a relative movement of one horizontal arm of the frame located at a distance from the extruder so as to compensate for the stretching of a sheet. The relative movement is generally less than 700 mm, preferably less than 500 mm and more preferably still it is between 300 and 500 mm.

More preferably, the frames are equipped with a suction system capable of holding the ends of the parison by suction. In one particular variant, the suction system comprises small orifices spread over the surface of the various movable blocks and connected to a vacuum device. Each orifice generally has a size of the order of mm. There may be, in general, several hundreds of orifices per block. The suction system may also preferably be used to blow air through the orifices so as to force the separation of the ends of the parison from the horizontal arms. In this way the orifices are cleared of any plastic which could block them after handling the parison.

In one particular embodiment of the above variant, the equipment also comprises a device for applying the parison to the frames and which is capable of being inserted inside this parison, in general while the tubular stream is taken up by the tensioning device. These may be, for example, PTFE slabs which are borne on a support introduced inside the parison and which can preferably be rotated around this support. These slabs may be deployed by an umbrella-opening type movement so as to come into contact with the parison in order to apply it to the frames.

After cutting the parison to obtain separate sheets, these sheets generally have a curved edge at the cut. Preferably, the stretching pins can also be moved so that they are applied against the edges of the sheets so as to flatten these edges against the frames.

According to one particularly preferred variant of the invention, all the components between the extrusion head and the mould are borne by a platform that can be moved along rails and that is capable of being controlled remotely by an operator. Hence, the equipment according to the invention preferably comprises a remote control that enables it to be positioned (between the extruder and the mould) or to be removed in the shortest time possible. Preferably, this control also enables the parison blades and the associated initiation guides (pins, clamps, etc.) to possibly be put into operation.

The invention also relates to a process for moulding a plastic hollow body using equipment as described previously, and that includes the following steps:
1. Starting the extrusion of a tubular stream of molten plastic;
2. Positioning the equipment so that the tensioning device is inserted in the tubular stream exiting the extrusion head;
3. Tensioning the tubular stream;
4. Transversely cutting the tubular stream from the extrusion head so as to create a parison having one free edge that is not taken up by the tensioning device;
5. Gripping the parison and moving it relative to the tensioning device by means of the gripping system so that the free edge is also taken up by the tensioning device and so that the parison can be cut longitudinally over its entire length;
6. Holding the parison by means of the handling device;
7. Longitudinally cutting the taut parison into sheets; and
8. Inserting the sheets into the mould cavities.

The invention also relates to the use of a process and/or of equipment as described above for manufacturing a fuel tank.

BRIEF DESCRIPTION OF THE DRAWINGS

The objective of FIGS. 1 to 7 is to illustrate the invention, without wishing to restrict the scope thereof in any way. For a detailed description of the invention, reference will now be made to the accompanying drawings in which.

DETAILED DESCRIPTION OF THE PREFERRED EMBODIMENTS

Figure 1:
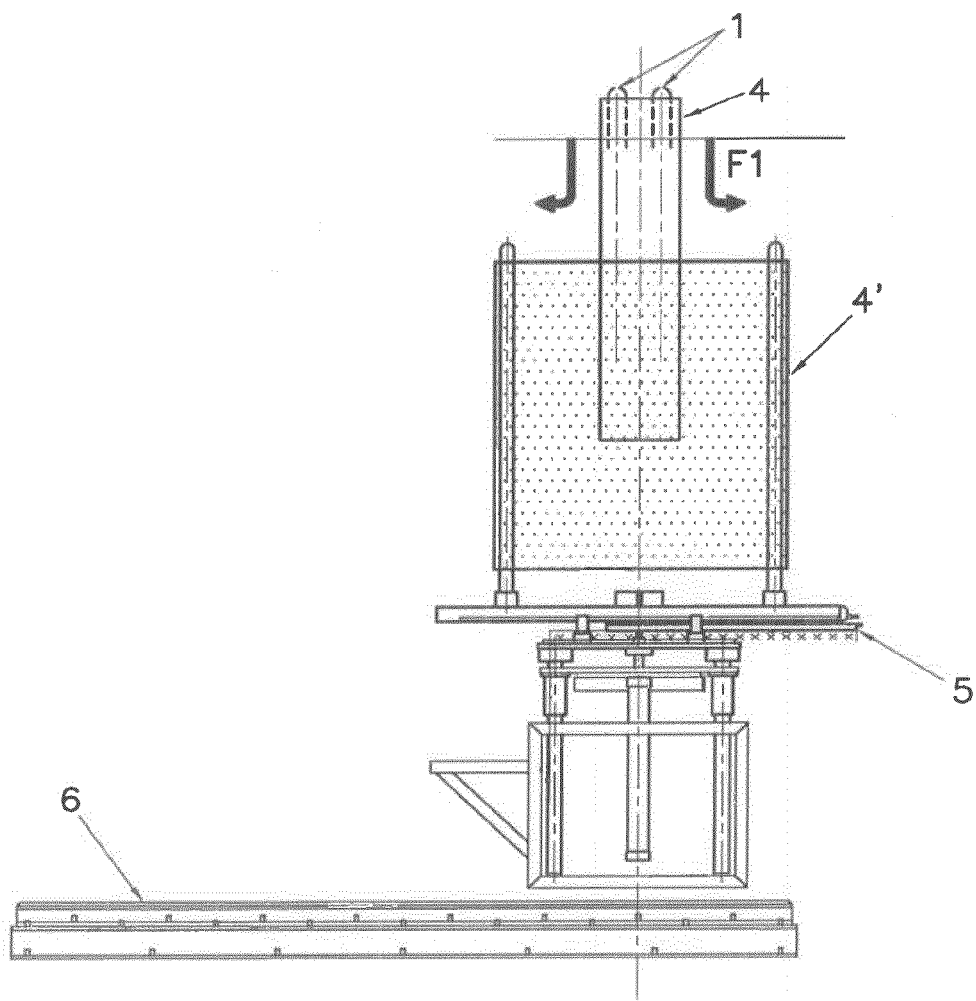
FIG. 1 illustrates a view of equipment according to the invention in operation.

Seen in FIG. 1 is a table (5) that can be moved along rails (6) and which bears a pair of stretching pins (1) represented as solid lines, in their position for tensioning a parison (4') (i.e. separated, for tensioning), and as dotted lines, in their position for taking up an extruded tubular stream (4). The passage from one position to the other is represented by arrows F1. A parison of oblong cross section (4') is obtained after transversely cutting the tubular stream (4) of material so as to create a free edge (not represented) and put under tension by the pins (1). This parison is cut into 2 sheets by a longitudinal cutting system (2) that is not illustrated in this figure but is shown in detail in FIGS. 4 and 5.

Figures 2, 3:
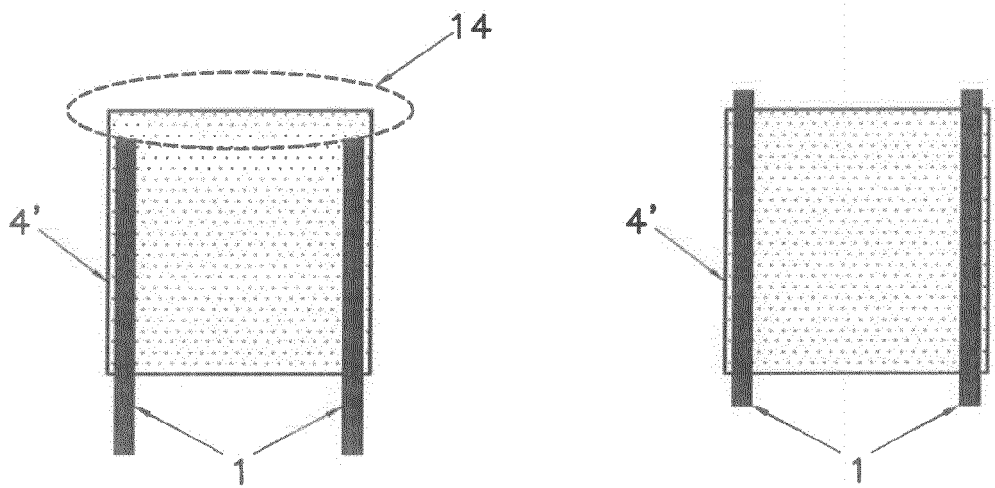
FIG. 2 illustrates a schematic view of a tensioned parison having one free edge that is not tensioned.
FIG. 3 illustrates a schematic view of a parison with a tensioned free edge.

FIGS. 2 and 3 illustrate the position of the parison (4') taken up by the pins (1) respectively before a movement relative to the pins (1) and having one free edge (14) and after a movement relative to the pins (1) so that the parison (4') is taken up by the pins (1) over its entire length.

Figure 4:
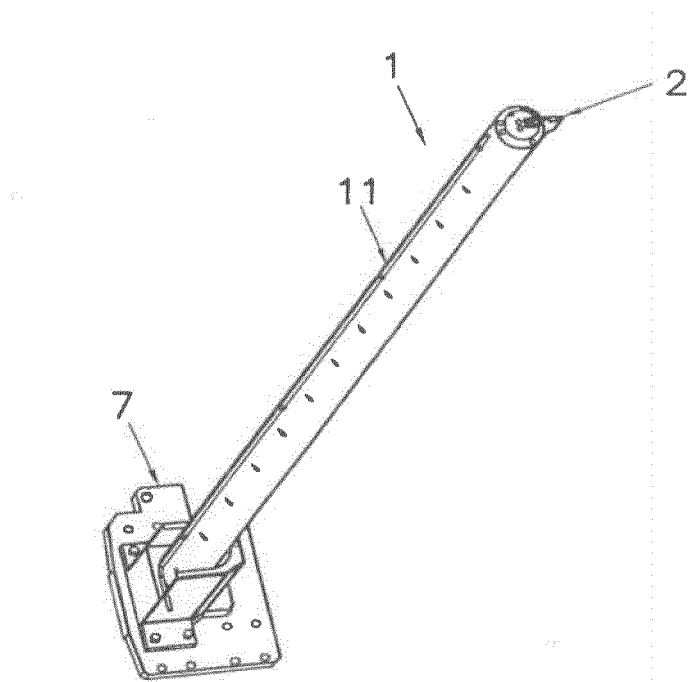
FIG. 4 illustrates an overview of a parison tensioning device.

FIG. 4 in fact illustrates a pin (1) and a support (7) on which a pin (1) is positioned. The support (7) can be moved on the table (5) (illustrated in FIG. 1) by means of a hydraulic jack (not represented) positioned substantially horizontally on the table (5). Also seen is a longitudinal cutting system in the form of a blade (2) positioned at one end of the pin (1). The blade (2) can be moved in a groove (not visible in the figure) made in the pin (1) by a pneumatic jack (not represented).

Figure 5:
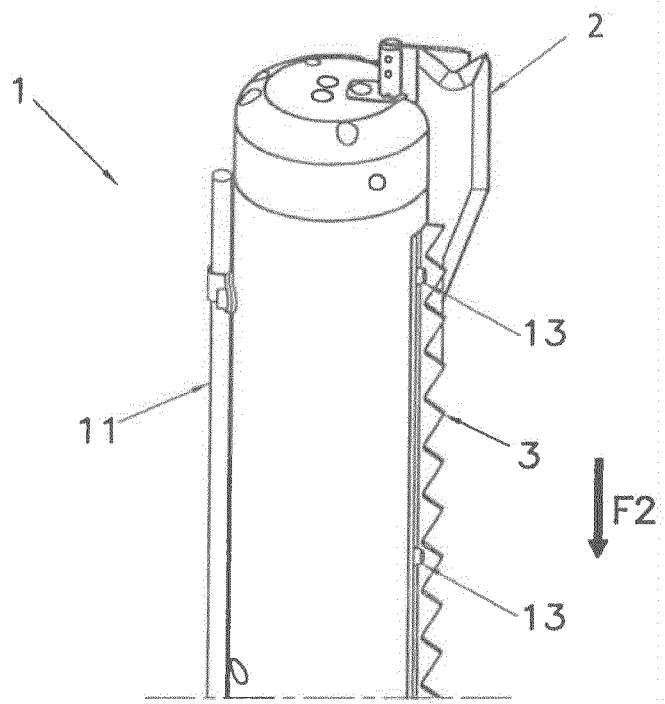
FIG. 5 illustrates an enlargement of a tensioning device.

FIG. 5 represents an enlargement of the pin (1) where the blade (2) is positioned at one end of the pin (1). A part (3) comprising movable teeth is also represented and is positioned along a generatrix of the pin (1). The part (3) can be moved longitudinally along a direction represented by the arrow F2 (i.e. in general, the extrusion direction) by means of a hydraulic jack (not represented). The part (3) comprises slots (not represented) which cooperate with screws (13) fixed to the pin (1) along a generatrix of the latter. The travel of the part (3) is determined by the travel of the hydraulic jack.

Also represented in FIGS. 4 and 5 is a sheath (11), positioned inside which is an electric cable for connection to a sensor of the end position of the blade (2).

Figure 6:
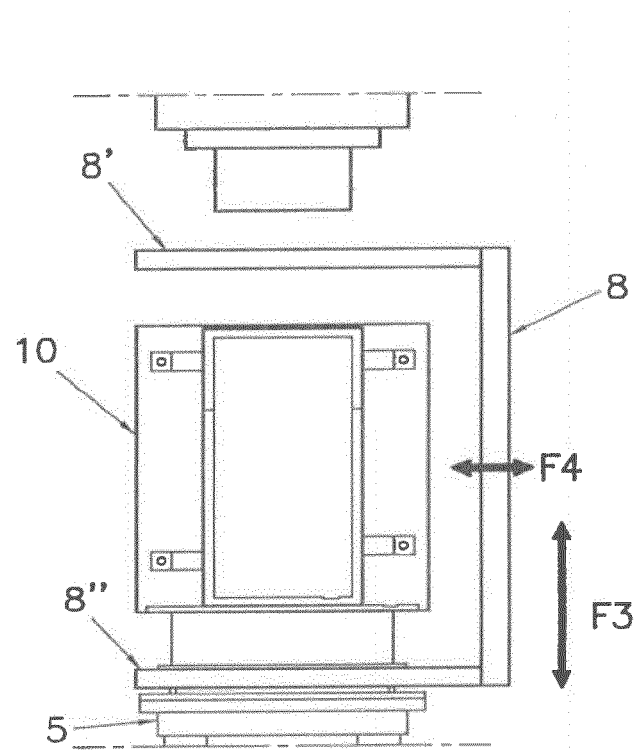
FIG. 6 illustrates an overview of equipment according to the invention with frame.
Figure 7:
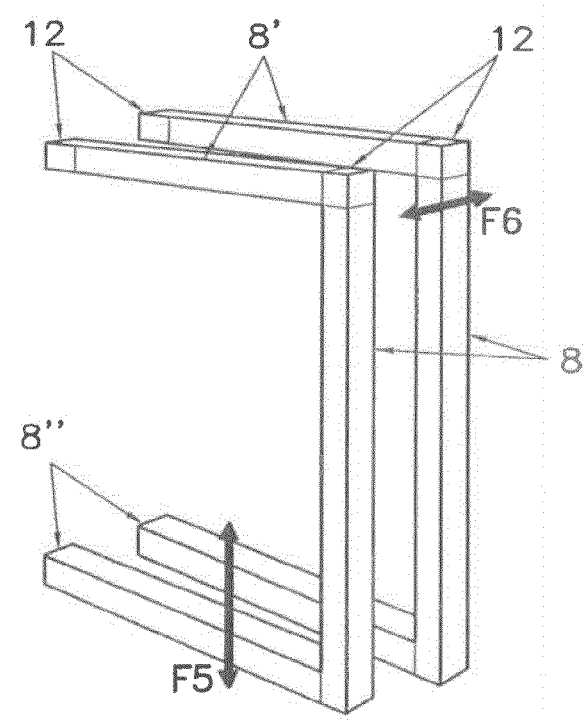
FIG. 7 illustrates an enlargement of two sheet-handling devices.

FIGS. 6 and 7 illustrate a preferred variant of the equipment according to the invention. According to this variant the equipment comprises a pair of C-shaped frames (8) that each have two horizontal arms (8',8") separated by a distance that is approximately equivalent to the length of the parison (4') and that are capable of holding the ends of the latter. The frames (8) can be moved horizontally or vertically along directions indicated by the arrows F3 and F4. The frames (8) are particularly moved along the direction indicated by the arrow F3 when the parison (4') is moved relative to the stretching pins (1), to avoid tearing the parison (4'). The frames (8) also make it possible to move the sheets obtained after cutting the parison (4') towards a press (10).

Illustrated in FIG. 7 by an arrow F5 is the direction along which the horizontal arms (8") can be moved so as to stretch the sheets obtained after cutting the parison (4') and thus compensate for the "sagging" effect which the sheets suffer under their own weight.

Also illustrated in FIG. 7 are the blocks (12) located at the ends of the arms (8') and that can be moved by a hydraulic jack (not represented) in a direction F6. When the end of the parison (4') located on the extruder side and held by the arms (8') is moved relative to the pins (1), the blocks (12) are released from the part of the parison (4') that is taken up by the pins (1) so that this part of the parison (4') is not trapped between the blocks (12) and the pins and to avoid tearing the parison (4'). After the parison (4') has been moved relative to the pins (1), the blocks (12) are moved by means of jacks and are applied to the part of the parison (4') that is taken up by the pins (1).

The invention claimed is:

1. A device for tensioning and flattening an extruded tubular stream of molten plastic that is insertable inside the tubular stream in order to apply a force to it in a substantially radial direction, said tensioning device comprising:
    two stretching pins,
    at least one longitudinal-cutting device that splits a parison which is attached to said at least one longitudinal-cutting device, and
    a device for gripping the parison obtained by transversely cutting the tubular stream, the gripping device being insertable inside the parison and enabling the parison to move relative to the tensioning device, wherein
    said device for gripping the parison comprises several moveable teeth positioned longitudinally on said stretching pins so that the parison is movable relative to the tensioning device.

2. An apparatus suitable for a process in which,
    a) a tubular stream of molten plastic is extruded;
    b) this tubular stream is taken up by a tensioning device;
    c) a transverse cut is made in said tubular stream so as to create a parison having one free edge that is not taken up by the tensioning device;
    d) the parison is moved relative to the tensioning device so that the free edge of the parison is taken up by the tensioning device; and
    e) at least one longitudinal cut is made in the parison over its entire length,
    said apparatus comprising, from upstream to downstream:
        an extrusion head to obtain a tubular stream of plastic;
        at least one transverse-cutting device to obtain a parison;
        said tensioning device according to claim 1; and
        a mold including two cavities and that is suitable for molding the parison.

3. The apparatus according to claim 2, wherein the two stretching pins are movable relative to one another and apply a radial force to the inner wall of the tubular stream at two diametrically opposed points of the latter, and this being achieved by moving them away from one another.

4. The apparatus according to claim 3, comprising a system of one or more jacks to control the radial force of the stretching pins on the tubular stream.

5. The apparatus according to claim 2, wherein the longitudinal-cutting device comprises two blades positioned in a diametrically opposed manner so as to separate the parison into two parts along two opposing generatrices.

6. The apparatus according to claim 5, comprising at least two C-shaped frames that have two horizontal arms separated by a distance that is approximately equivalent to the length of the parison and that hold the respective ends of the parison.

7. The apparatus according to claim 6, wherein the horizontal arms are movable relative to one another.

8. The apparatus according to claim 7, wherein the frames are equipped with a suction system holding the ends of the parison by suction.

9. The apparatus according to claim 6, comprising a device for applying the parison to the frames and which is insertable inside this parison.

10. The apparatus according to claim 2, wherein all the components between the extrusion head and the mould are borne by a platform that is movable along rails and that is controlled remotely by an operator.

* * * * *